3,582,308
GLASS PRESSING PLUNGER ASSEMBLY
John W. Eldred, Columbus, Ohio, assignor to The
Eldred Company, Columbus, Ohio
Filed Jan. 6, 1969, Ser. No. 789,289
Int. Cl. C03b *11/06*
U.S. Cl. 65—318                                 7 Claims

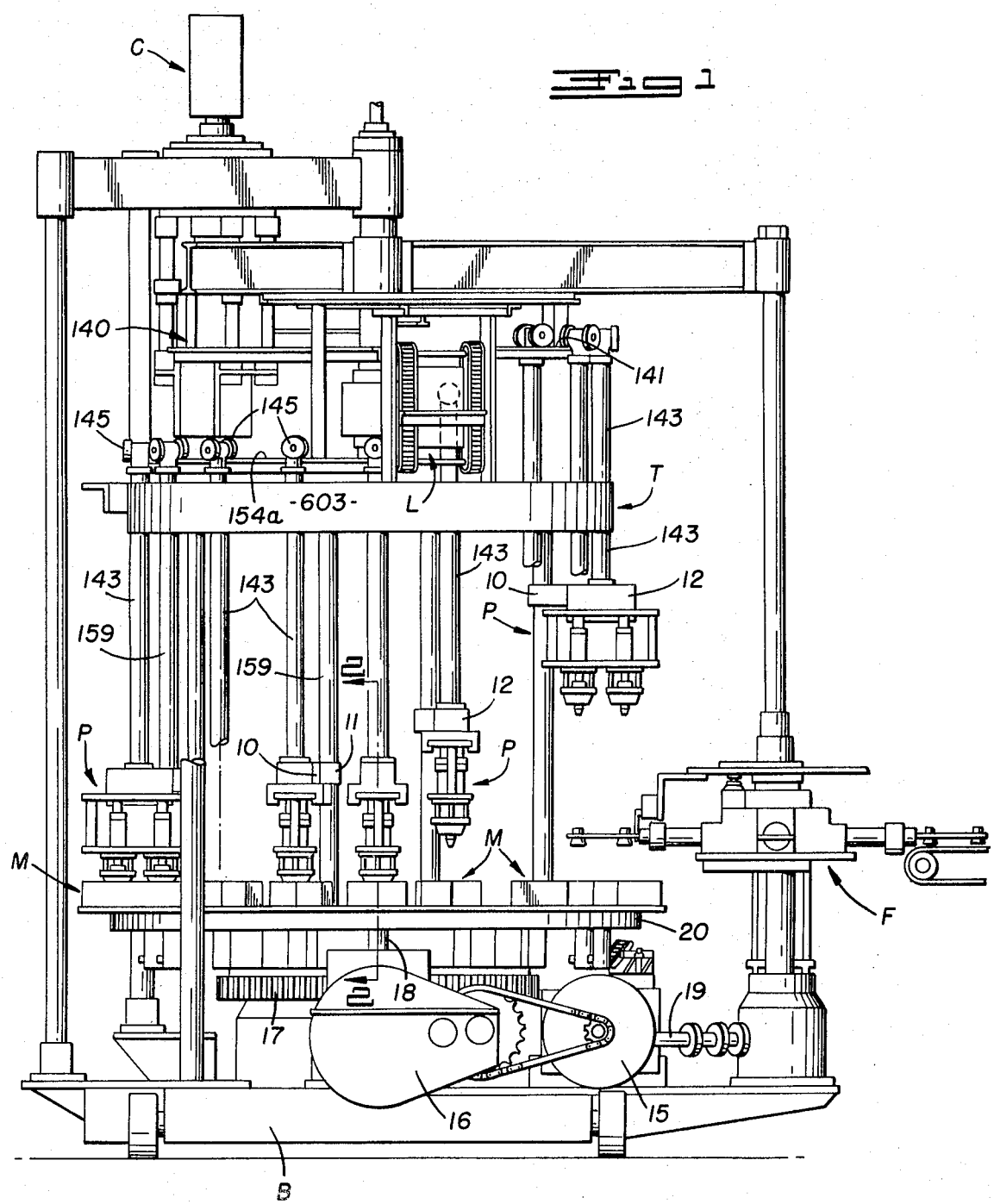

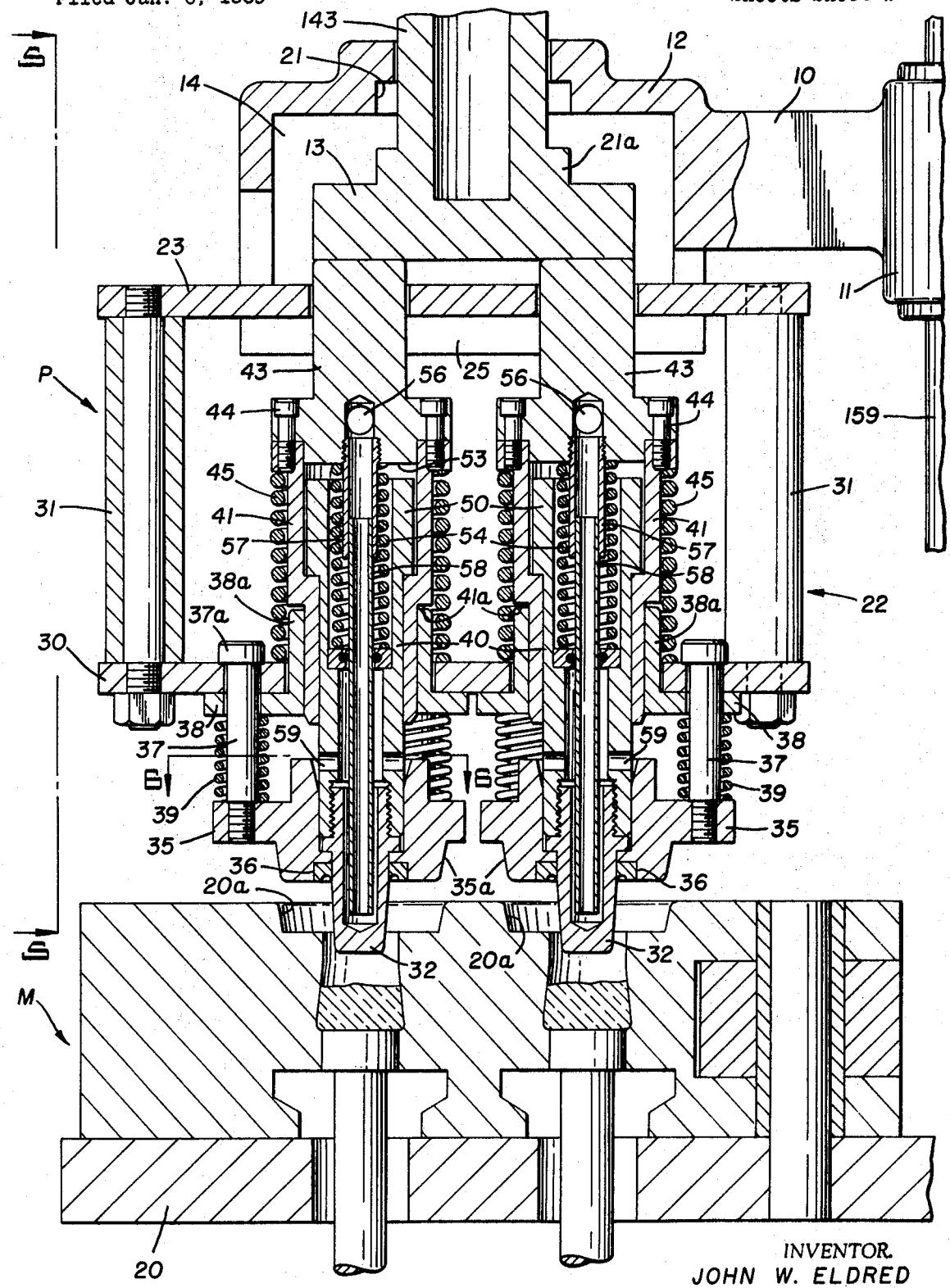

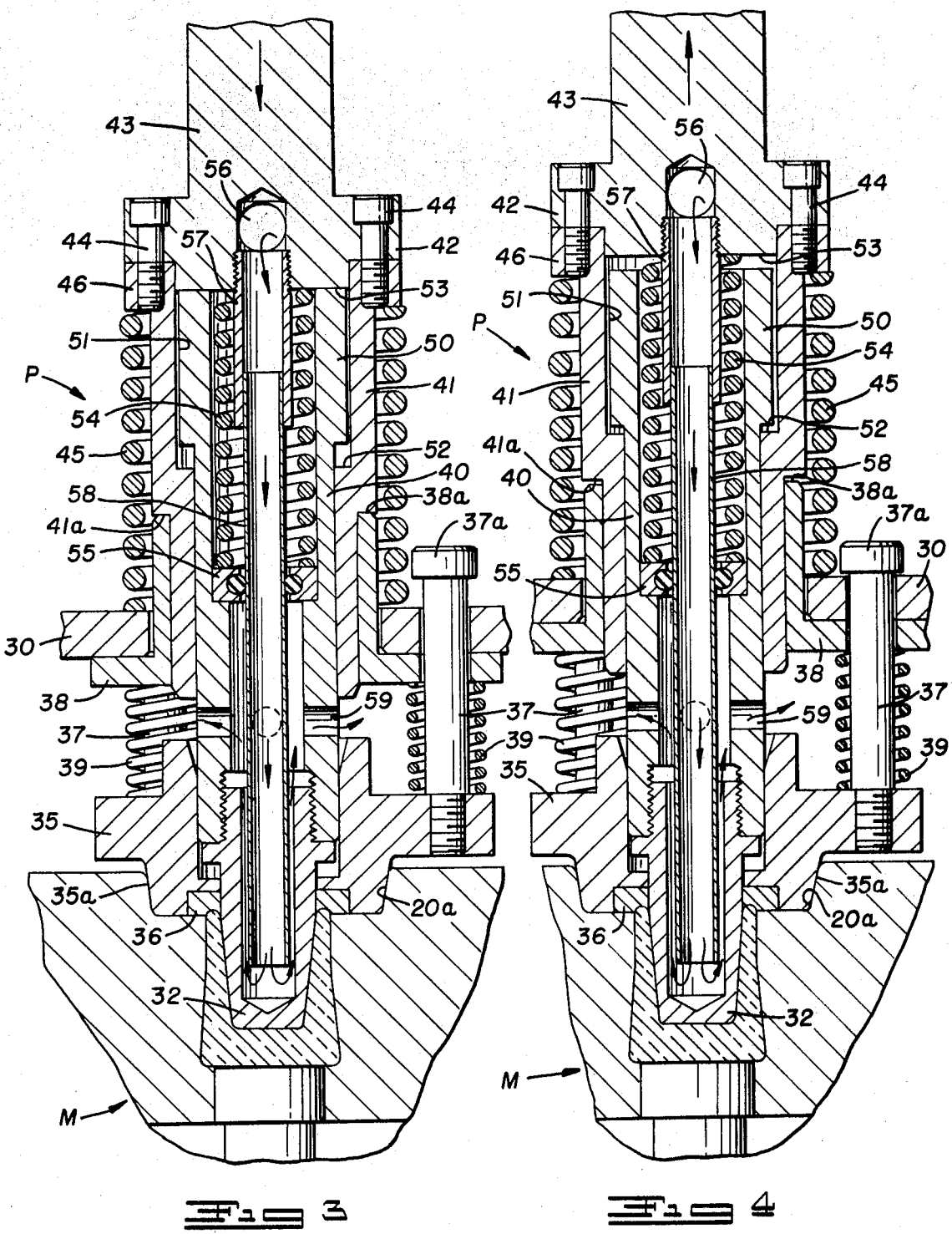

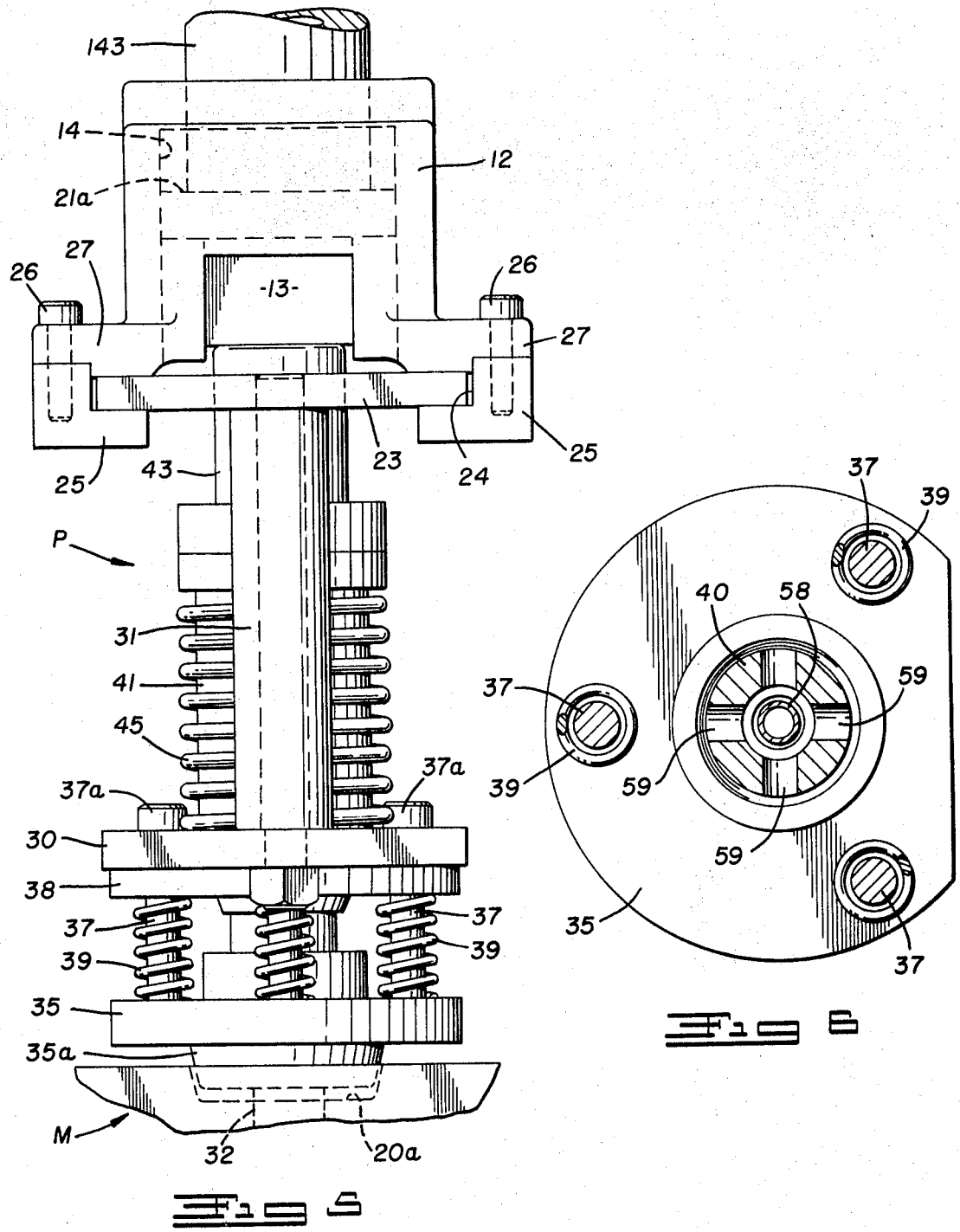

ABSTRACT OF THE DISCLOSURE

A glass pressing plunger assembly for use in connection with a mold on a movable mold table which is provided with means for readily mounting it on a suitable support or permitting removal therefrom. Also, it is provided with means permitting self-centering thereof relative to the mold with which it cooperates. In addition, it is provided with a dual pressure arrangement whereby sufficient pressure is first applied to press the glass charge in the mold and then a reduced pressure is employed thereafter to merely maintain the plunger in contact with the formed glass blank to extract the heat therefrom and set the glass, after which the plunger is completely removed from the mold to permit removal of the blank.

---

The plunger assembly of this invention may be used in conjunction with various types of glass presses or molding machines, for example, one of the type illustrated in the copending application of Eldred et al., Ser. No. 597,601 filed November 29, 1966.

There is a need for a pressing plunger assembly for use with glass molding machines of the type indicated which can be readily mounted on the machine or be removed therefrom, to permit replacement with similar units for pressing articles of other form or for replacement after wear. Also, there is a need for a plunger assembly which will center itself relative to the mold with which it is used. The present invention provides a simple arrangement whereby both of these needs are met. In addition, there is a need for an arrangement which will keep the plunger in contact with the molded blank until it sets, without making it necessary to stop the machine to maintain the high pressure used in the forming or pressing operation. The present invention provides a dual pressure arrangement whereby heavy pressure is used in the pressing operation and minimum pressure is then used for a selected period during rotation of the machine merely to maintain contact to extract heat and set the blank.

In the accompanying drawings, I have illustrated a preferred embodiment of my invention but it is to be understood that details can be varied without departing from basic principles of the invention.

In these drawings:

FIG. 1 is a schematic side elevational view showing the plunger assemblies of my invention applied to a suitable glass molding machine.

FIG. 2 is a vertical sectional view taken through one of the pressing plunger head assemblies and associated mold table portion along line 2—2 of FIG. 1, showing a double plunger type head assembly, with the plungers thereof in elevated position prior to the pressing operation.

FIG. 3 is a view showing one of the pressing plungers in enlarged vertical section and in association with a mold at the completion of the pressing operation.

FIG. 4 is a similar view but showing the plunger being withdrawn from the mold after the pressing operation.

FIG. 5 is an enlarged side elevational view taken from the position indicated at line 5—5 of FIG. 2.

FIG. 6 is an enlarged horizontal sectional view taken along line 6—6 of FIG. 2.

With reference, more particularly, to the drawings, in FIG. 1 a molding machine to which the plunger assemblies of the present invention can be applied, as described in said copending application, includes a continuously rotating turret indicated generally by the reference character T. The turret is supported for rotation on a base B. the turret includes a revolving mold table upon which is supported the molds M at angularly spaced intervals about its circumference. These molds may be of the split type with sections which swing apart under control of suitable means, or they may be solid molds which need not be opened, the first mentioned type being indicated in the drawings attached hereto. Suitable means (not shown) will be provided, as in the copending application, for introducing into each cavity of the mold M, indicated as a double-cavity type, a charge such as a gather or gob of molten glass or the like. As in the machine of the copending application, means is provided for pressing the glass charge in the cavities of the molds M and in the present case comprises double pressing plunger head assemblies P disposed above and in vertical registry with the cavities of double molds M and being mounted on the turret for continuous revolving movement in vertical alignment with the mold cavities. Means is provided for imparting vertical movement to the plungers of these assemblies P to produce at timed intervals controlled descent and ascent of the plungers into and out of the mold cavities of the molds M so as to press and form the charges in the respective cavities. This means may include a circular trackway 140, like that disclosed in said application, formed for the reception of elevation control rollers 145 provided on the upper ends of the vertically movable tubes or rods 143 which carry the plunger assemblies P at their lower ends. This circular trackway comprises an upper track 141 and a lower track 154a with an inclined track (not shown) extending between the two tracks. The machine may include a fluid pressure cylinder unit C adapted to be operated when the plungers reach their limit of descent, to produce positive pressure on the glass charges within the mold cavities to form the molded articles therefrom, a gap in the track permitting this downward pressure. As disclosed in said application, the machine may also include a plunger lifting or elevating unit L for lifting the plungers from the molds after formation of the blanks, a gap in the track permitting operation of this elevating means. The machine, as disclosed in said application, may also include an automatic ejector which raises the molded articles from the molds M during their continuous revolving movement to permit said articles to be engaged by a discharge or take-off unit F. All operations of the machine are effected automatically in proper sequential order, during the continuous revolving of the turret T.

The drive for the machine may be similar to that disclosed in said application and may comprise the prime mover shown as an electric motor 15 which drives a gear box 16 mounted on an extension of the base B. This gear box 16 drives the large ring gear 17 which is fixed to the mold table 20 that is part of the turret T and that carries the molds M and is mounted for rotation about the central stationary column 18 of the turret which is supported in a perpendicular position on the base B. The discharge or take-off unit F may be driven through a drive coupling shaft 19 from the ring gear 17.

Many other details of this particular machine are shown in said application but it is believed that the details specified above are sufficient to indicate a proper example of a machine to which the improved pressing plunger head assemblies P of this invention are applied. Also, it will be understood that although I have specified that the cylinder C applies the pressing force to the plungers and the unit L applies the lifting force thereto, it is to be understood that any suitable means may be provided for applying the downward pressing force to the plungers to form the glass in the molds or the lifting force to the plungers to lift them out of the molds M after the formation of the blanks.

The details of the pressing plunger head assemblies P of this invention are illustrated in FIGS. 2 to 6. These assemblies, as indicated, are supported at angularly spaced intervals on the rotatable turret T, by the vertically movable rods or tubes 143. Associated with each of these rods 143, fixed vertically but movable with the turret T on which they are mounted, are the vertically disposed guide rods 159. The axially fixed guide rods 159 are disposed parallel with the axes of the respective axially-vertically movable plunger support rods 143 and the rods 159 extend between an upper ring-like support 603 and the mold table 20 which are members that form part of the turret and revolve therewith. The guide rods are located radially inwardly of the associated rods 143 and the molds M. Each guide rod 159 has connected thereto for sliding vertical movement, as shown in FIG. 2, the radial support arm 10 which has the guide sleeve 11 on its inner end that surrounds the guide rod. At the outer end of this arm 10 there is provided the integral downwardly opening socket head 12 which has an opening at its upper side through which a lower portion of the support rod 143 extends. It will be noted from FIG. 1 that this head is rectangular and elongated in a radial direction.

The plunger assembly P is formed as a complete unit which may be termed a cartridge unit that can be readily slipped into the head 12 in cooperation with the lower end of the rod 143 or can be readily slipped therefrom for removal to facilitate maintenance or replacement. It will be noted from FIG. 2 that the lower end of the rod 143 has a rectangular shoe portion 13 which is elongated in the same direction as the head 12 and is adapted to be disposed in the downwardly opening socket 14 of the head 12. Above the shoe portion 13 is a boss portion 21a adapted to fit into a complemental reduced socket portion 21, at the top of the socket 14, when the rod 143 is lifted upwardly, limited axial movement of the rod and shoe relative to the head being permitted in the initial lifting movement of the rod 143.

The plunger assembly P itself is illustrated as a double plunger unit but it could be a single plunger unit. It is carried by a support frame 22 which includes an upper horizontal guide plate 23 that is adapted to slide into and out of a guide channel 24 provided at the lower edge of the head 12. This channel extends radially of the turret and is provided by the parallel guide and clamp strips 25, which, as shown best in FIG. 5, are removably attached by the bolts 26 to the integral flanges 27 formed on the head 12. It will be noted that the channel 24 is wider than the plate 23 to permit limited lateral movement of the plate in the channel. This channel 24 is open at its inner and outer ends to permit adjustment of the plunger assembly radially and the strips 25 will be used in clamping the plate 23 in position after radial and lateral adjustment. The frame 22 also includes a lower flat plate 30 in a horizontal plane parallel to the upper plate 23 and which is connected thereto by a plurality of vertically disposed bolt and spacer tube units 31.

Each of the plungers of the dual plunger assembly comprises the hollow pressing plunger tip which projects downwardly at the lower end of the assembly and is adapted to align with and fit into the associated mold cavity and which is designated by the numeral 32. In FIGS. 3 and 4, only one of the plunger tips 32 and associated mechanism is illustrated since both are identical. Each of these tips is mounted for vertical sliding movement in a mold ring 35 which is provided with a refractory sealing bushing 36 at its lower side for engaging the upper edge of the blank being pressed and an annular sealing surface on the cooperating mold M which surrounds the upper end of the associated mold cavity. The mold ring is biased downwardly by means of a plurality of plunger units which include bolts 37 having heads 37a on their upper ends and passing slidably downwardly through openings in the lower support plate 30 and threaded into a peripheral flange on the ring 35. These bolts also pass through a peripheral flange on a guide bushing 38 which is fitted into an opening in the plate 30 that is coaxial with the plunger tip 32 and which has an upper annular end 38a. Surrounding the bolts 37 and positioned between the flange of the bushing 38 and the flange of the ring 35 are the compression springs 39. These springs normally bias the mold ring 35 to a downward position determined by the heads 37a of the bolts 37 which serve as stops. If the plunger assembly P is in a lower position at this time, the ring 35 will seat on and seal against the mold M, as indicated in FIGS. 3 and 4. The mold rings 35 are provided with tapering, centering, depending border portions 35a which will cooperate with complemental upwardly opening sockets 20a around the mold cavities. In the initial adjustment of the position of the plunger assembly P, the bolts 26 will be slacked off so that the plate 23 will be free to float radially and laterally as the mold rings 35 are moved downwardly and the portions 35a thereof center in the sockets 20a of the molds and consequently center the plunger tips 32 relative to the mold cavities. Then the bolts 26 are tightened so that the strips 25 clamp the plate 23 in adjusted position.

The plunger tip 32 is hollow and has a threaded upper end which screws into a downwardly opening threaded socket in the lower end of a mounting sleeve 40. This sleeve 40, in turn, is vertically slidably mounted in an upright coaxial guide sleeve 41 which is slidably mounted in the bushing 38 for vertical axial movement relative thereto and which above the bushing end 38a has an annular pressure shoulder 41a. The upper end of this sleeve 41 surrounds the lower extremity 42 of a cylindrical pressure-applying member 43 and engages a peripheral annular flange thereon to which it is bolted by the bolts 44. The cylindrical members 43 have their upper ends mounted for vertical movement in openings formed on the upper frame plate 23. When the assembly P is positioned on the head 12, the upper flat ends of the members 43 are biased upwardly into contact with the lower flat surface of the shoe 13 by means of compression springs 45 which surround the sleeves 41 and bushings 38 and which engage the plate 30 at their lower ends and outwardly extending flanges 46 on the upper ends of the respective sleeves 41.

It will be noted best from FIGS. 3 and 4 that the upper end of the plunger tip mounting sleeve 40 is provided with an enlarged cylindrical guide portion 50 which is disposed for vertical movement in a tubular chamber 51 provided within the upper end of the sleeve 41. A lower annular stop shoulder 52 is provided by this chamber and the upper end of this chamber is closed by the lower flat surface 53 of the cylindrical member 43 which also serves as a stop. The chamber 51 is of a vertical extent somewhat greater than that of the guide portion 50 disposed therein. Normally, the guide portion 50 is biased downwardly so that its lower end contacts with the stop shoulder 52 by a compression spring 54 which is disposed within a socket in the sleeve 40 with its lower end resting on a collar 55 and its upper end in contact with the surface 53. However, limited axial upward movement of the sleeve 40 relative to the sleeve 41, until engagement with the surface 53, will be permitted.

Cooling air may be supplied to the plunger tip 32, as indicated best in FIGS. 3 and 4, by means of an inlet passage 56 in the member 43 which may be connected to a suitable source by a detachable flexible hose (not shown). The passage 56 leads to a central tube 57 depending from member 43 and telescopically receiving the upper end of a tube 58, which is supported within the sleeve 40 by the collar 55 and associated O-ring. This tube projects downwardly beyond the lower end of the sleeve 40 into the plunger tip 32 for conducting air thereinto. The air will pass upwardly from the plunger tip around the lower portion of the tube 58 and escape through outlets 59 leading radially outwardly through the sleeve 40.

Assuming one of the plunger assemblies P of the machine is in the condition illustrated in FIG. 2, the mold cavities of the molds M will be provided with suitable charges of glass, and the plunger assembly will be suspended by means of the rod 143 with the shoe 13 in its lower position within the head 12 so that the boss 21a is positioned below the socket 21. The dual plunger assembly P will actually be suspended from the lower side of the head 143 by means of the guide plate 23 resting on the associated guide strips 25. The mold rings 35 will be biased to their lowermost positions limited by the bolt heads 37a contacting the upper surface of the lower frame plate 30. The plunger tips 32 will be extended downwardly through the ring bushings 36 to the maximum extent determined by the lower end of the guide portion 50 of the sleeve 40 contacting with the stop shoulder 52 of the sleeve 41, the tips 32 being biased to this extended lower position by the springs 54. The compression springs 45 will serve to bias the cylindrical members 43 to upper positions where their upper ends are slightly above the upper surfaces of the plate 23 so that they are engaged by the lower flat surface of the shoe 13.

As the machine turret T rotates and the rods 143 are moved downwardly and then upwardly, the plunger assemblies P will function in the manner shown successively in FIGS 3 and 4, which as previously indicated, show a single plunger tip 32. Assuming the shoe 13 presses the member 43 downwardly, the tip 32 will enter the mold cavity and the guide portion 35a of the mold ring 35 will enter the socket 20a around the upper end of the previously centered mold cavity. The mold ring 35 is forced into sealing contact with the upper surface of the mold as shown in FIG. 3. At this time, the bolt heads 37a will be spaced above the plate 30 and also the guide portion 50 on the plunger tip support sleeve 40 will be lifted so that its upper end contacts the surface 53 and its lower end will be spaced above the shoulder 52. This latter spacing above the shoulder 52 will be less than the spacing of the heads 37a above the top surface of the plate 30. Downward movement of the member 43, as shown in FIG. 3, also compresses the spring 45 until the annular exterior pressure-applying shoulder 41a on the sleeve 41 abuts the upper annular end 38a of the bushing 38. This will serve to apply maximum pressure through the plunger tip 32 to press the glass charge and form the blank. It will be noted that the glass-pressing is accomplished through member 43, member 40, and plunger tip 32, all metal members in solid firm contact which, in effect, provide a continuous plunger, so that it will be possible to exert maximum pressure.

After a predetermined period of pressing during rotation of the turret T, the machine is arranged to provide a lifting force to the plunger assemblies P by applying an upward pull to the rod 143 which will eventually restore the respective plunger assemblies to the elevated position relative to the mold M as indicated in FIG. 2. During this upward movement, the radial support arm 10 will slide on the associated vertical guide rod 159 and it will be understood that this guide arrangement will always prevent rotation or horizontal twisting of the head 12 and associated plunger assembly P. An upward pull on the shoe 13 will allow the springs 45 to expand and move the cylindrical members 43 to their uppermost positions. During this upward movement of the members 43, the plunger tip controlling mechanism will function as indicated in FIG. 4. The sleeve 41 will be moved upwardly with the member 43 and the sleeve 40 will be biased downwardly by the spring 54. However, the lower end of guide portion 50 in the sleeve 40 will not contact the shoulder 52 so that the plunger tip 32 will be held downwardly in contact with the glass blank by the action of the spring 54. Also, at this time, the mold ring 35 will still be held in contact with the upper side of the mold M since the bolt heads 37a will still be spaced above the plate 30, as indicated in FIG. 4. This will provide for maintaining contact of the plunger tip with the blank for a selected period so as to extract heat from the glass of the blank and set the blank, this being aided by circulation of cooling air through the tip. This contact is maintained with minimum pressure provided by the spring 54.

After a sufficient period of time to permit setting of the glass, the continued raising of the assembly P will lift the mold ring 35 from the upper surface of the mold M and subsequently the plunger tip 32 out of the mold cavity, after which the formed blank can be removed from the mold cavity.

It will be apparent that with this arrangement a dual pressure operation is effected without stopping the machine. Maximum pressure is applied through each plunger tip 32 during the pressing operation through which, in effect, is a solid plunger due to the contact of solid abutments. At the proper time, this pressure is eliminated and during the continuous movement of the plunger assembly with the turret the relatively light spring 54 takes over to supply only the minor pressure needed to keep the plunger tip in contact with the blank to permit cooling and setting thereof. The plunger assembly P will readily adjust itself automatically to center relative to the mold cavities, if the clamping plates 25 are released, and it is of such a nature that it can be removed or replaced as a unit merely by slipping the plate 23 radially outwardly or inwardly in the guide channel 24 of the head 12. At this time, the shoe 13 will be in its upper position within the head 12.

Having thus described this invention, what is claimed is:

1. A plunger assembly for pressing glass or other moldable material in an upwardly opening mold comprising a depending plunger tip and relatively vertically axially movable members for applying pressure to said tip, said members having abutments normally axially vertically spaced but which can be brought downwardly together to move the tip into the mold for the primary pressing operation and separated after such operation by relative upward movement, and additional resilient means cooperating with said plunger tip after the abutments are separated for applying downward axial yieldable holding secondary pressure thereto to maintain contact of the tip and the blank formed thereby during cooling and setting of the glass thereof, means for moving said members relatively axially vertically in one direction to engage said abutments and in an opposite direction to disengage said abutments and permit said additional means to apply pressure to maintain said contact, said plunger assembly including a mold ring which is supported concentric with the plunger tip and which cooperates therewith and with the mold during formation of the glass blank therein, resilient means carried by the plunger assembly for forcing the mold ring into engagement with the mold, said mold ring having a projecting tapering guide portion and the mold ring having a complemental centering socket for receiving said guide portion, said axially movable members including a vertically axially movable support and pressure member with a hollow guide sleeve carried by said member in a fixed depending position relative thereto, a movable plunger tip support sleeve carried within said guide sleeve for limited vertical axial movement and carrying said plunger tip, said plunger tip support sleeve having one of said abutments which is engaged by another of said abutments on said pressure member during the primary pressing operation said additional pressure applying means comprising a spring enclosed within said guide sleeve for biasing said support sleeve relative to said guide sleeve to an axially extended downward position where its said abutment is disengaged from said abutment on said pressure member when the pressure member is moved upwardly to move said guide sleeve therewith.

2. A plunger assembly according to claim 1 including upper and lower support and guide plates fixed relatively in vertically spaced relationship, said support and pressure member being mounted for vertical axial movement in said upper plate, said guide sleeve being mounted for corresponding movement in said lower plate, said biasing means for said mold ring being disposed between it and said lower plate and biasing means operatively connected between said support and pressure member and said lower plate for urging said member upwardly through said upper plate.

3. A plunger assembly according to claim 2 in which said plunger tip support sleeve comprises a guide portion mounted in said guide sleeve for limited movement between upper and lower stop portions and normally biased toward said lower stop portion by said additional pressure-applying spring, the upper stop portion being the abutment of said support and pressure member and the lower stop portion being on said guide sleeve, said mold ring being suspended from said lower plate by plunger units including said downward biasing means, said plunger units each including a pin passing downwardly through said plate and having a stop above said plate, said pin being connected to said ring and said biasing means comprising springs between said ring and said plate, said guide portion contacting with said lower stop portion before said pin stop contacts with said plate.

4. In combination with the plunger assembly of claim 3, a rod for suspending it and moving it vertically, said rod being a part of said moving means, and means for supporting the assembly from said rod, said means permitting limited axial movement of the rod and the upper support plate.

5. In combination with the plunger assembly of claim 3, means for supporting the upper plate for limited horizontal floating movement to permit centering adjustment of the assembly relative to the mold, and means for securing the plate in adjusted position.

6. The combination of claim 5 in which said support means includes a guide channel in which said plate is free to move in two directions, and means cooperating with said guide channel for clamping the plate in fixed position.

7. The combination of claim 6 in which said support and pressure member is in the form of a shoe having an upward extension mounted for the vertical axial movement in said upper plate, said shoe having the said pressure member abutment formed by its lower surface which engages the upper end of said plunger tip support sleeve that forms the said abutment thereof.

References Cited
UNITED STATES PATENTS

| | | | |
|---|---|---|---|
| 628,157 | 7/1899 | Cleveland | 65—318 |
| 2,966,006 | 12/1960 | Sherts et al. | 65—323 |

ARTHUR D. KELLOGG, Primary Examiner

U.S. Cl. X.R.

65—307, 323